United States Patent [19]

Gerulis

[11] Patent Number: 4,581,135
[45] Date of Patent: Apr. 8, 1986

[54] SELF-CLEANING FLUID FILTER WITH A DRAIN

[75] Inventor: Benedict R. Gerulis, Blaine, Minn.

[73] Assignee: Henry C. Kova, Anoka, Minn.

[21] Appl. No.: 524,649

[22] Filed: Aug. 19, 1983

[51] Int. Cl.[4] .............................................. B01D 27/10
[52] U.S. Cl. .................................... 210/108; 210/133;
    210/411; 210/416.4; 210/427; 210/430; 55/218;
                                        55/313; 55/314; 55/303
[58] Field of Search ............... 210/130, 131, 108, 235,
        210/411, 416.4, 430, DIG. 14, 425, 427, 429,
        798, 123, 133; 55/215, 218, 313, 314, 288, 303;
                                                    123/196 A

[56] References Cited

U.S. PATENT DOCUMENTS

| | | | |
|---|---|---|---|
| 3,004,670 | 10/1961 | Zonker | 210/429 |
| 3,142,640 | 7/1964 | Otto, Jr. | 210/130 |
| 3,235,085 | 2/1966 | Humbert, Jr. | 210/130 |
| 3,618,775 | 11/1971 | Hultgren | 210/130 |
| 3,948,773 | 4/1976 | Tucker | 210/108 |
| 4,053,405 | 10/1977 | Dekeyser et al. | 210/123 |
| 4,090,962 | 5/1978 | Braukmann | 210/108 |
| 4,284,500 | 8/1981 | Keck | 210/411 |
| 4,295,963 | 10/1981 | Drori | 210/108 |
| 4,427,542 | 1/1984 | Glover | 210/123 |

FOREIGN PATENT DOCUMENTS

| | | | |
|---|---|---|---|
| 1020604 | 12/1957 | Fed. Rep. of Germany | 210/130 |
| 2339891 | 2/1975 | Fed. Rep. of Germany | 210/108 |

Primary Examiner—Richard V. Fisher
Assistant Examiner—Wanda L. Millard
Attorney, Agent, or Firm—Henry C. Kovar

[57] ABSTRACT

A self-cleaning renewable fluid filter that flushes a permanent filter media while the used oil is pumped out by the engine oil pump through a drain in the housing. The fluid filter has an inlet and a drain, a center core with an outlet, a drain valve normally closing the drain, a permanent fluid filter media inbetween the inlet and outlet, a plug for closing the outlet, an actuator for opening the drain valve and an improved bypass valve which bypasses fluid and enables reversal of fluid flow through the filter media during draining for flushing the media. The preferred drain valve actuator is an electric solenoid coil inside of the filter and the improved bypass valve is an annular valve around the center core and inside of a cylinder formed in an inlet end cap of the filter media. The used oil is pumped out the drain after it has passed through the media in a reversed direction, while the engine is idling, until the engine oil sump is evacuated and the ensuing air from the pump forces the oil out of the filter housing.

17 Claims, 4 Drawing Figures

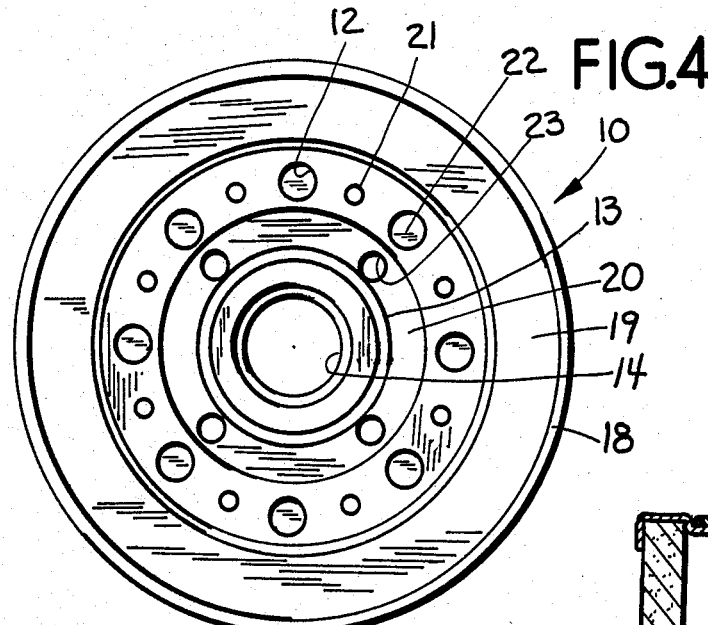
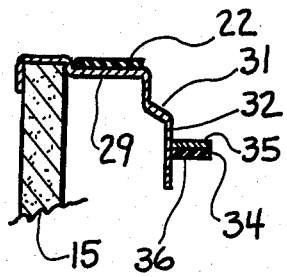
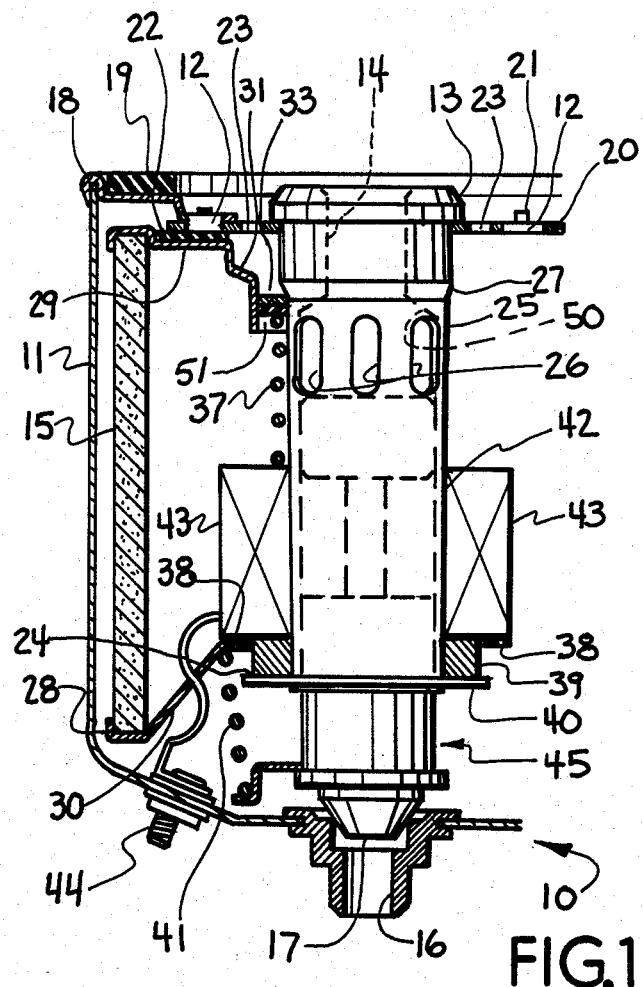
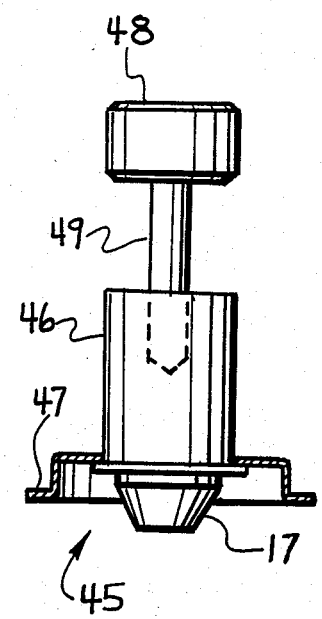
FIG. 4
FIG. 3
FIG. 1
FIG. 2

SELF-CLEANING FLUID FILTER WITH A DRAIN

BACKGROUND OF THE INVENTION

1. Field of the Invention

This invention pertains to a fluid filter having structure for draining used fluid and for cleaning a renewable permanent filter media, and to a filter having an improved bypass valve that will bypass fluid at a predetermined pressure drop; the filter will operate effectively without changing spring tension, in all pressure systems from 20 to 100 p.s.i.

2. The Prior Art

It is a known fact that the more often the engine oil is changed, the longer the vehicle engine will last. It is also well-known that a clean filter is important to the life of the engine. Most people do not take advantage of these well-known facts. Oil and filter changing is a dirty and undesirable task. It has become a franchised business in the United States to offer a "quickie" oil and filter change. The practice of routine oil and filter change extends the life of a vehicle engine; a worn engine wastes fuel and emits excessive noxious fumes. As previously mentioned, the oil and filter change is a popular franchised business. Service stations as well as car dealers specialize in oil and filter changes. However, each year there is less service performed by them and many have closed these facilities and have gone to self-service operations or have closed indefinitely, leaving fewer places where this task can be done for the car owner. This creates an inconvenience and effects a more expensive cost of maintaining the proper oil and filter change intervals. Consequently, the disadvantages of having it done are leading the car owner to do-it-yourself methods which are dirty and dangerous where the do-it-yourselfer has to raise the car and get beneath to open the oil drain and also remove the filter, resulting in a dirty mess, not to mention time consumed. In spite of this, do-it-yourself oil and filter changing has become very popular. Both oil and filters can now be purchased very economically at discount stores, auto accessory stores and even in drug stores. Nevertheless, it leaves the car owner with the dirty, unpleasant task of cleaning oil and filter.

Many more people would turn to the do-it-yourself way if it were to be made easier and less of a mess.

The most revelant known prior U.S. patents are Nos. 2,068,727 and 3,282,380. The former teaches use of the oil pump in an idling engine to evacuate the engine sump of used oil via a hose into an oil bucket. The latter device has a separate battery operated pump to evacuate an engine sump. Neither of these examples have any teachings or suggestion of flushing a renewable filter during evacuation.

OBJECTS OF THE INVENTION

It is an object of the present invention to provide a self-cleaning reusable filter.

It is an object of the present invention to provide a fluid filter having an improved bypass valve.

It is an object of the present invention to provide a fluid filter, having a valve for draining used fluid.

It is an object of the present invention to provide a self-cleaning reusable engine oil filter having valves for draining used oil and for reversing the flow of oil through the filter during draining for cleaning a filter media.

These and other objects of the present invention will become manifest to those versed in the art upon review and study of the teachings herein.

SUMMARY OF THE INVENTION

According to the principles of the present invention, a self-cleaning fluid filter has a housing with an inlet and a drain, a center core inside of the housing, an outlet in the center core, a filter media in the housing, means for closing the outlet, drain valve means for opening the normally closed drain and means for reversing the fluid flow through the filter media when the outlet is closed and the drain is open.

A filter with an improved bypass valve has a housing with an inlet and a central core having an outlet, a filter media between the inlet and outlet, a cylindrical bypass valve stem portion of the center core, a bypass cylinder concentrically around the valve stem, an annular bypass valve inbetween the stem and the cylinder, and a resilient biasing means closing the bypass valve until the bypass valve is overcome by an excessive pressure differential.

A self-cleaning engine oil filter for draining engine oil has a housing with an inlet and outlet, a reusable oil filter media, an oil drain having a normally closed drain valve, means for closing a filter outlet and means for opening the drain valve, and means for reversing the flow of engine oil through the filter media during draining for the purpose of flushing the media during the draining of used oil.

BRIEF DESCRIPTION OF THE DRAWINGS

FIG. 1 is an elevational cross section view of the preferred embodiment of a self-cleaning fluid filter with a drain, according to the present invention;

FIG. 2 is a detail of the piston in the structure of FIG. 1;

FIG. 3 is a detail sectional view of the inlet valve and bypass valve structure shown in FIG. 1; and FIG. 4 is a plan view of the attachment end of the structure of FIG. 1.

DESCRIPTION OF THE PREFERRED EMBODIMENTS

The principles of the present invention are particularly useful when embodied in a self-cleaning fluid filter such as that shown in FIG. 1 and generally indicated by the numeral 10. The filter 10 includes a housing 11 having a fluid inlet 12, a central core 13 with a fluid outlet 14, a filter media 15 and a used oil drain 16 which is normally closed by a drain valve 17.

The housing 11 further includes a seamed on housing cover 18, which has the conventional gasket 19. An annular inlet disc 20 is secured to the core 13 and is keyed to the disc 20 by lugs 21 and is headed or welded to the housing cover 18. The main fluid inlet 12 is a pattern of circular registered holes through the housing cover 18 and the disc 20; the holes are registered by the lugs 21, and the under surface of the disc 20 around the inlet holes 12 forms an inlet valve seat for an elastomer inlet valve 22. In the inner side of the main or primary inlet hole 12 is a secondary inlet 23, for allowing fluid to flow through the bypass passageway 33 and to allow reverse flow of fluid into a reverse flow inlet 51 when the inlet 12 and outlet 14 are closed, for oil and filter flushing. The bypass valve 34 acts also to bypass fluid whenever the filter 10 can no longer pass sufficient oil through the media 15 as will be described.

The central core 13 has the threaded fluid outlet 14 by which the filter 10 is conventionally secured to a vehicle engine. Inside of the housing 11, the core 13 has a bypass valve stem 25, which has a fluid return port 26 comprised of a plurality of elongated slots in fluid communication with the outlet 14. A bypass valve stop 27 is spaced inward from the fluid port 26.

A filter cartridge generally indicated by the numeral 28 includes the filter media 15, which is reusable and may be of a sintered bronze or a comparable material manufactured by and available from several companies. The cartridge 28 has an annular inlet end cap 29 and an outer end cap 30, both of which are secured to the media 15. The inlet end cap 29 carries the inlet valve 22, a servo annulus 31 and a bypass valve cylinder 32 which is concentric to and spaced outward from the bypass valve stem 25. Between the cylinder 32 and the stem 25 is a bypass and reverse flow fluid passageway 33, which is fluid tightly sealed by an annular bypass valve 34. The bypass valve 34 has an outer metal washer 35 and an inner elastomer washer 36 sandwiched together. The bypass valve 34 is biased in the passageway 33 and against the stop 27 by a helical compression type bypass valve spring 37. The outer end cap 30 contains an elastomer sliding seal 38, which fluid tightly seals against a seal surface 39 of a fixed retainer 40 secured to the core 13. The entire filter cartridge 28 and the inlet valve 22 are floating and are biased by an outer closing spring 41 of the compression type.

The central core 13 has a non-magnetic cylindrical section 42 about which is placed an electrical solenoid 43. The solenoid 43 is held in place by the non-magnetic retainer 40. An electrical wire lead from the solenoid 43 extends through the outer end cap 30 to a terminal 44 on the outside of the housing 11. The terminal 44 is intended to be connected to a control switch (not shown) remotely placed at a convenient area of the vehicle, such as the engine compartment or under the dash.

At least partially within the cylindrical portion 42, is a piston 45, which carries the drain valve 17, a magnetic armature 46 and a spring seat 47. The closing spring 41 is placed reactively between the seat 47 and the outer end cap 30 and therefore reactively between the drain valve 17 and the inlet valve 22. The piston also has a non-magnetic outlet plug 48, which is connected to and spaced from the armature 46 by a non-magnetic connecting rod 49. The solenoid 43 is mounted outside of the piston 45. Inside the core 13 is an outlet plug seat 50 which is inbetween the return port 26 and the outlet 14. On the inside of the fluid passageway 33 is a reverse flow fluid inlet 51.

The annular area of the inlet end cap 29 is greater than the annular area of the outer end cap 30. The area of the servo annulus 31 is greater than the annular area of the bypass valve 34. The filter cartridge 28 is a floating cartridge 28 and although it is biased against the disc surface 20 by the closing spring 41, the cartridge 28 can be forced outward by fluid pressure until the outer end cap 30 makes contact with a stop 24, restraining further outward movement of cartridge 28.

In use and operation of the filter 10, the filter 10 is easily installed, just as is a regular standard filter with the exception of the requirement for connecting a suitable drain tube (not shown) to the drain 16 on the filter and an electrical wire from the terminal 44 to a control switch placed in a remote location. The drain tube is extended remotely from the filter 10 to a place of ready access; for example, under the outer-most front part of the vehicle.

In normal operation, oil enters the filter 10 through the primary inlet 12 by the oil pressure forcing the inlet valve 22 and the cartridge 28 outward from the disc surface 20. Oil then flows through the filter media 15 from the outside or upstream side to the inside or downstream side and then through the return port 26 and outlet 14 to engine oil galleries. The bypass valve 34 functions whenever an excess pressure differential is created between inlet and outlet flow, forcing the bypass valve 34 outward, uncovering the return port 26 and bypassing the filter media 15.

When the time comes for changing oil, a pan is placed under the end of the drain tube from the drain 16. The engine is started and allowed to run at idle. Electrical contact is made by closing the control switch, which energizes the solenoid 43, causing the armature 46 to move in and open the drain 16. Concurrently the outlet plug 48 moves into the return port 26 and to seat 50, closing the outlet 14. When the piston 45 is pulled in by the solenoid 43, the closing spring 41 is fully compressed which holds the filter cartridge 28 and the inlet valve 22 tightly against the primary inlet 12. With the primary inlet 12 and the outlet 14 closed, engine oil enters through the secondary inlet 23 and oil pressure forces the bypass valve 34 to open the passage 33 to the reverse flow inlet 51. The inlet flow of oil is now reversed and flows through the filter media 15 from the inside or downstream side to outside or the upstream side, flushing the filter media 15 of entrapped contaminants which in turn are drained through the open drain 16, as and with the used oil. When the sump is emptied, the engine pump will then pump air, which will then force the oil out of the filter 10, completing the evacuation of all the used oil. With the engine off and control switch opened, the solenoid 43 is de-energized, allowing the spring 41 to retract the armature 46 and the piston 45, which in turn opens outlet 14 and closes outlet drain 16. However, outlet 12 remains closed by the opposing force of the spring 41 against cartridge 28 and valve 22, which now acts as an anti-drainback valve. The engine is then refilled with oil and is ready to go with the new oil and a clean flushed filter media 15.

Unlike the known method of draining oil and removing the filter, which requires the need for raising the vehicle and crawling underneath, which is an unpleasant and dirty job, the filter 10 of the present invention after the initial permanent installation, allows the task to be done in all types of weather, quickly and efficiently without getting dirty and making a mess, by simply pushing a button from within the vehicle. A further advantage, besides the convenience of and time saved with the present invention, is the money saved which in turn, very quickly pays for the filter 10.

The present invention has the advantage of having clean oil and a clean filter just by a push of a button, anywhere or anytime, with an added advantage that the oil with the sludge and other contaminants are being pumped out under pressure while in suspension, rather than a gravity drain which leaves some of the contaminants as a residue in the bottom of the oil pan.

Although other advantages may be found and realized, and various and minor modifications suggested by those versed in the art, be it understood that I wish to embody within the scope of the patent warranted hereon, all such embodiments as reasonably and properly come within the scope of my contribution to the art.

I claim as my invention:

1. A self-cleaning fluid filter comprising:
   (a) a housing having means defining a fluid inlet, and a drain for used fluid;
   (b) a central tubular core fixed inside of the housing, said core having means defining a fluid outlet;
   (c) a filter media in the housing and upon the fixed core and between the inlet and outlet for normally filtering a flow of fluid through the housing;
   (d) normally open means within said filter for selectively and intermittenly closing said outlet;
   (e) a normally closed drain valve structurally connected to said normally open means, for selectively opening the drain when the filter outlet is closed;
   (f) means for reversing the fluid flow through the filter media when said outlet is closed and said drain is opened, for flushing the filter media while draining out the used fluid; and
   (g) a filter media cartridge having the media and an end cap carrying an inlet valve, said inlet closing means comprising biasing means resiliently connecting the drain valve to the media cartridge, for holding the inlet valve against the inlet when the drain is opened.

2. A self-cleaning fluid filter comprising:
   (a) a housing having means defining a fluid inlet, and a drain for evacuating used fluid;
   (b) a central tubular core fixed inside of the housing, said core having means defining a fluid outlet;
   (c) a filter media in the housing and between the inlet and outlet for normally filtering a flow of fluid through the housing;
   (d) normally open means within said filter for selectively and intermittently closing said outlet;
   (e) a normally closed drain valve structurally connected to the normally open means, for selectively opening the drain when the filter outlet is closed;
   (f) means for reversing the fluid flow through the filter media when said outlet is closed and said drain is opened, for flushing the filter media while draining out the used fluid; and
   (g) a movably mounted filter media cartridge movable fore and aft inside of the housing and having:
      (1) said media;
      (2) an inlet end cap on a first end of said media;
      (3) an outer end cap on a second and opposed end of said media;
      (4) an inlet valve on said inlet end cap;
      (5) means resiliently biasing the filter cartridge so that the inlet valve normally closes the inlet; and in which
      (6) said normally open means and said drain valve are operable for restraining said inlet valve against the inlet when the drain is opened.

3. A fluid filter according to claim 2, in which the cartridge biasing means comprises a compression spring reactively mounted between the movable outer end cap and the movable drain valve.

4. A fluid filter according to claim 2, including axially sliding lip seal means for sealing the movable outer end cap to the fixed center core.

5. A self-cleaning fluid filter comprising:
   (a) a housing having a fluid inlet, and a drain for evacuating used fluid;
   (b) a central tubular core inside of the housing, said core having a fluid outlet;
   (c) a filter media in the housing and between the inlet and outlet for normally filtering a flow of fluid through the housing;
   (d) closing means within said filter for closing said outlet;
   (e) a drain valve normally closing the drain and for selectively opening the drain when the filter outlet is closed;
   (f) means for reversing the fluid flow through the filter media when said outlet is closed and said drain is opened, for flushing the filter media while draining out the used fluid;
   (g) a piston having said outlet closing means and said drain valve; and
   (h) a solenoid coil within said housing for operating the piston, said piston including a magnetic armature.

6. A fluid filter according to claim 5, in which said solenoid coil surrounds a non-magnetic cylindrical portion of said center core, said piston armature being within said core.

7. A fluid filter according to claim 6, in which the piston plug and connecting rod are non-magnetic, said connecting rod being within said solenoid coil when the drain valve is closed.

8. A self-cleaning fluid filter comprising:
   (a) a housing having a fluid inlet, and a drain for evacuating used fluid;
   (b) a central tubular core inside of the housing, said core having a fluid outlet;
   (c) a filter media in the housing and between the inlet and outlet for normally filtering a flow of fluid through the housing;
   (d) closing means within said filter for closing said outlet;
   (e) a drain valve normally closing the drain and for selectively opening the drain when the filter outlet is closed;
   (f) means for reversing the fluid flow through the filter media when said outlet is closed and said drain is opened, for flushing the filter media while draining out the used fluid; and
   (g) said drain valve having a magnetic armature and said outlet closing means being a non-magnetic piston plug connected to said armature, said filter including a solenoid coil around said armature for operating both the drain valve and the piston plug.

9. A fluid filter according to claim 8, in which said armature and plug are placed inside of a non-magnetic cylindrical portion of said center core, said solenoid coil being mounted upon said non-magnetic core portion.

10. A self-cleaning fluid filter comprising:
   (a) a housing having means defining a fluid inlet, and a drain for evacuating used fluid;
   (b) a central tubular core fixed inside of the housing, said core having means defining a fluid outlet;
   (c) a filter media in the housing and between the inlet and outlet for normally filtering a flow of fluid through the housing;
   (d) normally open means within said filter for selectively and intermittently closing said outlet;
   (e) a normally closed drain valve structively connected to the normally open means, for selectively opening the drain when the filter outlet is closed;
   (f) means for reversing the fluid flow through the filter media when said outlet is closed and said drain is opened, for flushing the filter media while draining out the used fluid; and (g) means for biasing said drain valve closed and said normally open means open, said biasing means being ultimately reactively opposed by an inlet valve normally seated against said inlet.

11. A fluid filter according to claim 10, said drain valve including means for compressing said biasing means when said drain is opened, the biasing means increasing force holding said inlet valve upon the inlet when said biasing means is compressed.

12. A self-cleaning fluid filter comprising:
   (a) a housing having means defining a fluid inlet, and a drain for evacuating used fluid;
   (b) a central tubular core fixed inside of the housing, said core having means defining a fluid outlet;
   (c) a filter media in the housing and between the inlet and outlet for normally filtering a flow of fluid through the housing;
   (d) means within said filter and said core for closing said outlet;
   (e) a normally closed drain valve operatively connected the said means for selectively opening the drain when the filter outlet is closed;
   (f) means for reversing the fluid flow through the filter media when said outlet is closed and said drain is opened, for flushing the filter media while draining out the used fluid;
   (g) an axially movably mounted filter media cartridge having:
      (1) said filter media,
      (2) an outer end cap having an axially slidable sealing engagement with the central core, and
      (3) an inlet end cap having a greater annular surface area than a simularly measured annual surface area of said outer end cap, so that pressure outside of the end caps and media will bias the cartridge axially away from the inlet;
   (h) an axially movable annular bypass valve sealing the inlet end cap to the central core; and
   (i) a spring biasing the filter cartridge toward the inlet.

13. A filter having an improved bypass valve, comprising:
   (a) a housing having an end cap with means defining a fluid inlet and a fixed central core having means defining a central fluid outlet;
   (b) a filter media within the housing and between the inlet and the outlet;
   (c) a cylindrical bypass valve stem fixed on the core, said stem having means defining an outlet port providing fluid communication between the filter media and the outlet;
   (d) a bypass cylinder concentrically around the outside of and spaced from the stem, there being means defining an annular bypass passageway between the cylinder and the stem, said cylinder and passageway extending at least partially over said outlet port;
   (e) an axially movable annular bypass valve between the stem and the cylinder, said bypass valve having a normal position restrained by a bypass valve stop and in which the bypass valve fluid tightly seals and closes the bypass passageway;
   (f) resilient biasing means for biasing the bypass valve into said normal position, said bypass valve being movable by an excessive fluid pressure differential from the normal position to an alternate position wherein the bypass valve is in the cylinder and is over and has uncovered the outlet port and has fluidly connected the inlet directly to the outlet, enabling fluid to bypass the filter media; and
   (g) the bypass valve stop is a fixed step on the central core.

14. The filter of claim 13, in which the bypass valve is a metal washer sandwiched to an elastomer washer.

15. A filter having an improved bypass valve, comprising:
   (a) a housing having an end cap with means defining a fluid inlet and a fixed central core having means defining a central fluid outlet;
   (b) a filter media within the housing and between the inlet and the outlet;
   (c) a cylindrical bypass valve stem fixed on the core, said stem having means defining an outlet port providing fluid communication between the filter media and the outlet;
   (d) an axially movable bypass cylinder concentrically around the outside of and spaced from the stem, there being means defining an annular bypass passageway between the cylinder and the stem, said cylinder and passageway extending at least partially over said outlet port;
   (e) an axially movable annular bypass valve between the stem and the cylinder, said bypass valve having a normal position restrained by a bypass valve stop and in which the bypass valve fluid tightly seals and closes the bypass passageway;
   (f) resilient biasing means for biasing the bypass valve into said normal position, said bypass valve being movable by an excessive fluid pressure differential from the normal position to an alternate position wherein the bypass valve is in the cylinder and is over and has uncovered the outlet port and has fluidly connected the inlet directly to the outlet, enabling fluid to bypass the filter media; and
   (g) in which the bypass cylinder extends outward substantially past the valve stem towards the inlet and outlet, said cylinder being connected to the media and being axially movable along the fixed central core when a fluid inlet valve is opened off of the fluid inlet.

16. A filter having an improved bypass valve, comprising:
   (a) a housing having an end cap with means defining a fluid inlet and a fixed central core having means defining a central fluid outlet;
   (b) a filter media within the housing and between the inlet and the outlet;
   (c) a cylindrical bypass valve stem fixed on the core, said stem having means defining an outlet port providing fluid communication between the filter media and the outlet;
   (d) a bypass cylinder concentrically around the outside of and spaced from the stem, there being means defining an annular bypass passageway between the cylinder and the stem, said cylinder and passageway extending at least partially over said outlet port;
   (e) an axially movable annular bypass valve between the stem and the cylinder, said bypass valve having a normal position restrained by a bypass valve stop and in which the bypass valve normally fluid tightly seals and closes the bypass passageway;
   (f) resilient biasing means for biasing the bypass valve into said normal position, said bypass valve being movable by an excessive fluid pressure differential from the normal position to an alternate position wherein the bypass valve is in the cylinder and is over and has uncovered the outlet port and has fluidly connected the inlet directly to the outlet, enabling fluid to bypass the filter media;

(g) means for closing said fluid outlet;

(h) a normally closed drain from said housing;

(i) a reverse flow inlet into the inside of the media from the inside of said cylinder; and (j) means for selectively closing the first said inlet and the outlet and for opening the drain, so that pressurized fluid must force and axially move the bypass valve until the reserve flow inlet is opened; whereupon, the flow of fluid will be reversed through the filter media and then propelled out the drain.

17. A self-cleaning fluid filter comprising:

(a) a housing having means defining a fluid inlet, and a drain for evacuating used fluid;

(b) a central tubular core inside of the housing, said core having means defining a fluid outlet;

(c) a filter media in the housing and between the inlet and outlet for normally filtering a flow of fluid through the housing;

(d) closing means within said filter for closing said outlet;

(e) a drain valve normally closing the drain and for selectively opening the drain when the filter outlet is closed;

(f) means for reversing the fluid flow through the filter media when said outlet is closed and said drain is opened, for flushing the filter media while draining out the used fluid;

(g) a movably mounted filter media cartridge movable fore and aft inside of the housing and having:
  (1) said media;
  (2) an inlet end cap on a first end of said media;
  (3) an outer end cap on a second and opposed end of said media;
  (4) an inlet valve on said inlet end cap;
  (5) means resiliently biasing the filter cartridge so that the inlet valve normally closes the inlet; and in which
  (6) said closing means is operable for restraining said inlet valve against the inlet when the drain is opened; and (h) an electromagnetic actuator enclosed by the media cartridge, said actuator being operative for opening said drain valve.

* * * * *